(12) United States Patent
Huang et al.

(10) Patent No.: US 11,738,925 B2
(45) Date of Patent: *Aug. 29, 2023

(54) COTTON BALER

(71) Applicant: Baling Green USA Inc, Santa Ana, CA (US)

(72) Inventors: Tong Huang, Santa Ana, CA (US); Yaoqing Xiong, Santa Ana, CA (US); Yuanli Lyu, Santa Ana, CA (US)

(73) Assignee: BALING GREEN USA INC, Santa Ana, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/816,714

(22) Filed: Aug. 1, 2022

(65) Prior Publication Data

US 2022/0371797 A1 Nov. 24, 2022

Related U.S. Application Data

(63) Continuation of application No. 16/895,536, filed on Jun. 8, 2020, now Pat. No. 11,465,820.

(30) Foreign Application Priority Data

Mar. 27, 2020 (CN) .......................... 202010229523.9

(51) Int. Cl.
*B65D 65/14* (2006.01)
*B65H 18/28* (2006.01)
*A01F 15/07* (2006.01)

(52) U.S. Cl.
CPC ............. *B65D 65/14* (2013.01); *B65H 18/28* (2013.01); *A01F 2015/0745* (2013.01); *B65H 2701/1944* (2013.01)

(58) Field of Classification Search
None
See application file for complete search history.

(56) References Cited

U.S. PATENT DOCUMENTS

| 678,720 A | 7/1901 | Cochrane |
| 754,108 A | 3/1904 | Wunder, Jr. |
| 11,142,382 B1 | 10/2021 | Hayes |

*Primary Examiner* — Alexander S Thomas
(74) *Attorney, Agent, or Firm* — KOS IP Law LLP

(57) ABSTRACT

The invention uses a new system which cuts and unlocks a wrapping material (PE film) for cotton in a continuous manner in cotton harvesting, and a new method in production of such film. The film consists of many segments that make many bales of cotton. The film is separated with perforation by laser or other methods. A double sided adhesive is used to glue the bale at the end of it, which is covered by a folded bridge. The bridge connects both ends of the segments of the film. When perforated film is torn at a signal by the harvest machine, the bridge is unfolded as a leading edge for the next segment after a brief bridge linkage of both segments. The way of folding the bridge is key part of the invention, which accurately uncovers the end adhesive for the new bale and reduces the problem of tangling of the film at the time of separation.

15 Claims, 5 Drawing Sheets

COTTON BALER

CROSS REFERENCE TO RELATED APPLICATIONS

This application is a continuation patent application of U.S. Ser. No. 16/895,536, filed on Jun. 8, 2020, which claims priority from China patent application 202010229523.9, filed on Mar. 27, 2020 with the China National Intellectual Property Association, the entire contents of which are expressly incorporated herein by reference.

STATEMENT RE: FEDERALLY SPONSORED RESEARCH/DEVELOPMENT

Not Applicable.

BACKGROUND

This invention is in the field of agriculture, a packaging film and its automation production system.

A variety of different prior art references show cotton bailer. For example, in the U.S. Pat. No. 6,787,209 Wrapping Material With AZ-Lock System And Methods Of Making Of Making And Using The Same by inventor Nissim Mass, published Sep. 7, 2004 the abstract discloses, "Method and material for wrapping items using a wrapping material made up of separate wrapping portion of a predetermined length. The wrapping portions are attached and released at their ends using a Z-lock system. The Z-lock system holds the wrapping portions together during manufacturing but can also easily release or separate the wrapping portions at a desired point in the wrapping process. The separating of the wrapping portions exposes an adhesive that is use to securely bond at least one wrapping portion to the item being wrapped at the end of a wrapping cycle."

For example, in the U.S. Pat. No. 7,541,080 Wrapping Material with a Z-lock System by inventor Nissim Mass, published Jun. 2, 2009 the abstract discloses, 11 Method and material for wrapping items using a wrapping material made up of separate wrapping portions of a predetermined length. The wrapping portions are attached and released at their ends using a Z-lock system including a discrete laminate. The discrete laminate of the Z-lock system holds the wrapping portions together during manufacturing but can also easily release or separate the wrapping portions at a desired point in the wrapping process. The separating of the wrapping portions exposes an adhesive that is use to securely bond at least one wrapping portion to the item being wrapped at the end of a wrapping cycle."

The existing technology belongs to Tama Plastic Industries of Israel, which has its Z lock patent, U.S. Pat. No. 6,787,209B2 and U.S. Pat. No. 7,541,080B2. It is widely used in the industry making cotton bales with John Deere automation harvesters, e.g., CP690. It makes 24 bales continuously with one roll of film. When a previous bale finished, a new bale automatically starts to package. Like in FIG. 1, segment 1 and segment 2 separate when a brake applies to the harvester, and Z lock peels off at 4 and glues at 3, the head of next segment.

Simple version makes Z shape lock into V shape lock.

When in production, at the separation point the film is cut into two, or use 2 separate films. You need to apply a lock to two pieces of film, and wind the lock into a film roll, then continue to the next lock point. A roll has many locks and cuts. The lock is just strong enough to make film roll winding and unwinding. When there is a signal from the film, the harvester makes a brake on the unwinding roll, the lock unlocks, separating the film and making a complete bale. The end adhesive applies to the end of bale after the lock is peeled off the adhesive.

This Technology has Many Flaws:

1. Production process is complicated.

1) It cuts the film perpendicularly, or uses glue binding 2 pieces of film together.

2) Segment 1 needs fold back for 180 degree with a width of 200 mm, a special frame is needed to hold the soft film.

3) Z lock is glued to the film on the folded surface.

4) Segment 2 needs to move forward for 200 mm to be attached to segment 1 and the lock above.

5) The other end of lock needs to be folded 180 degree to glue to the head of segment 2, difficult for automation.

6) The convex lock part glued to the films has to be in the direction against the roll winding, for when baling this part has to be smooth with the roll's unwinding direction. Owing to the softness and width of the film, it is difficult to handle the film.

2. Add adhesives to film in production makes the production environment messy.

3. Speed of production is slow.

4. Defective rate is high.

All above show that the automation for soft film with locks is difficult. We need an easy and highly automated production technology for this agricultural packaging film production.

BRIEF SUMMARY

The easy process of production of this agricultural packaging requires avoiding usage of the Z lock patent, cutting the film, and lots of gluing. The process uses double sided adhesives replacing adding adhesives in the production line, also uses a bridge made of releasable film to promote production with higher quality.

The technologies used in the invention are as follows:

The agricultural packaging material consists of many portions continuously. Between portions perforations are produced, which are lines where portions will be separated when certain dragging force is applied. Between portions there is a folded bridge made of releasable film which uncovers a double sided adhesive used to glue the bale of an agricultural harvest, such as cotton and grains. The other side of the bridge is glued to the head of the next portion. When the bridge is unfolded it can be a lead of the next portion into the harvest machine's intake.

We might use one more adhesive tape to make the bridge thicker and harder to avoid the recoil force when the film is separated.

The holes made by perforation laser are spread unevenly, in the center area the holes are denser and bigger, on the two sides holes are looser and smaller.

The perforation line is the middle line on both sides of which there are two double sided adhesive tapes.

The complete automation production line has many units, including film production, pre manufactured rolls with adhesive tapes, perforation laser, and a roll laying machine.

The bridge that links the two portions of the film is folded in a way that its two tapes glue at two sides of the perforation line. One adhesive tape glues at the head of next portion, another tape serves at the end of the bale to make sure the bale is tightly tied. One side surface of the bridge is made of releasable film, the other side is not releasable. When the bridge is unfolded, the adhesive is exposed to film that wraps the cotton. The bale's end film is glued tight with the double sided adhesive tape.

The film production system consists of automation production line with features: pre manufactured roll of double sided adhesives, automation machines to lay bridge rolls, laser perforation machines.

The pre manufactured roll consists of the bridge with two double sided adhesives. The bridge is made of folded film with stripping feature on one side that covers the adhesive at the end of the bale, and adhesive feature on the other side which glues the bridge to the front head of the next segment.

The roll laying machine consists of a cutter, a press hand, the first catch hand, the second catch hand, and a guide track. The two catch hands can hold double sided adhesives with up and down motions. The second catch hand drags the roll to the other side of film along the track above the table. Together with the first catch hand the both hands aim the perforation line placing the roll over the film, with two adhesives tapes on each side of the perforation line. Then the press hand pushes down to glue the roll over the film, and the cutter cuts the roll at the end of the track. The perforation laser machine makes holes over the film.

The laser machine is programmable.

The cutter is also using laser as the source of power.

The adhesive tapes of pre manufactured roll have interleaving papers, which need to be peeled off by auto machine.

Automation Production

1) Perforation laser makes holes on the film at pre determined position.

2) a catch hand grabs the per manufactured roll of adhesive tapes across the film from near side to further side, along the perforation line.

3) Press hand pushes down the roll to glue the roll to the film.

4) Cutter cuts the roll and both catch hands move back to the beginning position ready for the next move.

The tape roll covers the film lining up with the perforation line.

Laser machine is programmable.

The invention has the following advantages:

1) The invention skips the film cutting and gluing, also skips the Z type lock that links the different portions of the film. The film is one piece with a line of perforations, and while when a brake applies to the film's unwinding roll the film separates into two parts automatically. This technology avoids at least two steps in the existing production process, i e putting Z lock between the two portions of film and moving the second portion of film forward to cover the distance that the first portion folds for Z lock gluing. The invention uses double sided adhesive tapes to replace adding adhesive during the production, making production scene clean. The invention uses a bridge made of releasable film which uncovers the double sided adhesive tape. When the bridged is unfolded, the exposed adhesive glues the film at the end of the bale. The unfolding process of the bridge is automatically executed when there is a brake applied to the film's unwinding roll, which unwinds during the baling. The bridge becomes a flat and hard piece that serves as a lead for the next film portion, because the following end of bridge is glued tightly at the head of the next portion. We also have a design that has two pieces of double sided adhesive tapes on the next portion of film, reducing greatly the recoil force when the film is torn into two pieces through the perforation holes. The recoil can make soft film entangled inside the baling unit that has many rotating axes.

2) The invention keeps the film unmoved when we lay a bridge, i.e. we only move 24 time making a roll. This technology skips steps 2 to 5 for the existing technology. E.g. using the mold to hold the large soft film, etc. The production process becomes simple rolling and tape laying automation.

3) The invention uses a simple flat bridge, and does not use the Z type lock which is thick and convex. So the step 5 in existing technology is skipped. It is smooth to wind the film roll with double sided adhesive tape instead of convex locks.

BRIEF DESCRIPTION OF THE DRAWINGS

With the reference to the drawings, the invention will be described in more detail.

DETAILED DESCRIPTION

Figure 1:
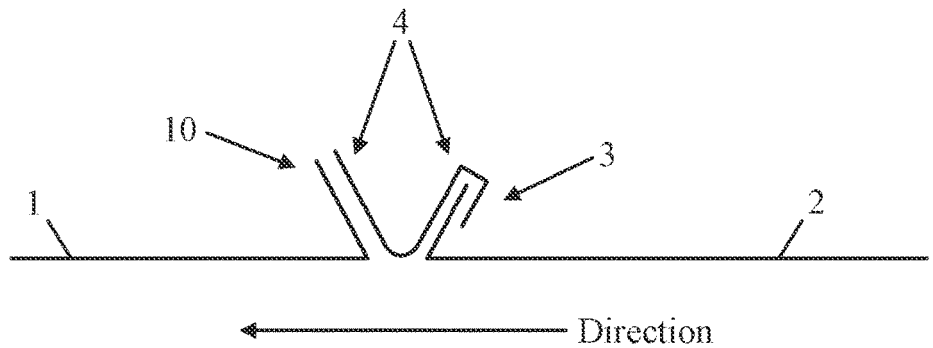
FIG. 1 is the existing technology for the agricultural packaging.
Figure 2:
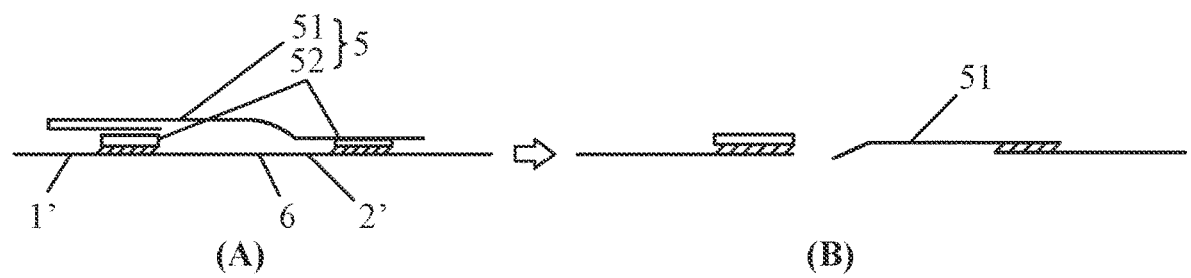
FIG. 2 shows the structure changes of this invention for an agricultural packaging in practice, (A) shows the beginning status; (B) shows the status after the film is torn into two pieces.
Figure 3:
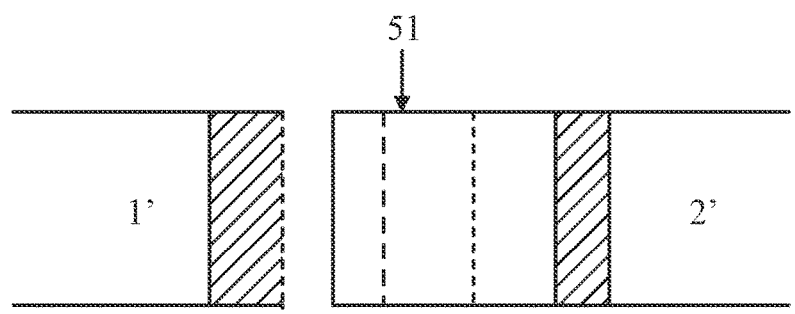
FIG. 3 shows the baling film's status after the film is torn in practice.

Technicians of the production field shall understand the drawings here are not limited to their narrow meaning. More claims are based on the principles of the invention, expandable to wider areas in similar productions.

More steps and numbers are in the boundaries of claims of the invention. A, or single form can be regarded same as plural forms in principle. Similar process and units or parts are regarded same as the claimed.

Words described here are not limited to regular meanings. All similar terms are regarded same as used here, shall not be too narrowly explained.

With this invention many products are already manufactured and in field use, e.g. cotton bales made from Deere Harvester CP690. In FIG. 2 to FIG. 5, long film is divided into many units making many bales of cotton. Each unit consists of plain film and adhesive film. Plain film wraps the cotton first for a round then light adhesive film wraps outer layers of cotton bales.

Units are separated at the perforation line 6 with portion 1' for the previous unit, and portion 2' for the following unit. 6 is the perforation line which makes the film break into two pieces easily. Portion 1' and Portion 2' are glued to double sided adhesive tapes 5. 51 is the bridge made of releasable film, glued at Portion 1', and Portion 2 with adhesives 52, on the both sides of perforation line 6. The upper side surface of the film 51 is releasable, so it is easy to peel off from 52 at the Portion 1', but glued tight at 52 of the Portion 2'. The lower side of the film is not releasable. We can see the bridge made of the releasable film is folded S shape.

A roll of film is a long piece for over 500 meters. Between portions are perforation lines which can be easily and smoothly torn apart when unwinding of the roll is stopped. The bridge still links and covers the torn portions briefly when they are torn apart for a short distance as the bridge unfolding, which makes recoil force weakened to avoid tangling of the film. The material of bridge is hard and flat when unfolded, which serves as a lead for the next portion waiting to enter the baling harvester for the next baling.

The invention makes simple perforation line, and does not need use Z type lock, nor cutting and pasting the film, thus skipping many steps of existing production processes, such as aligning films while adding locks. The invention also replaces adding adhesive to the film with double sided adhesive tapes, which are accurately exposed by peeling off the bridge over them. The bridge is evenly flat, not convex over the film, easy for winding into the film roll.

Programmable laser can adjust structure of the perforation line easily according to the change of working conditions of baling. We design the perforation line's hole structure with different density and diameters accordingly.

We design a pattern with larger and denser holes in the middle of the perforation line and looser and smaller holes at two sides, making tearing of the film starting in the middle, and then evenly along two sides. In this way the film moves straight and gradually into the next cycle.

In theory larger the area bridge glued to the film, weaker the recoil force will be when the film being torn apart, but more costly in material and production.

Figure 4:
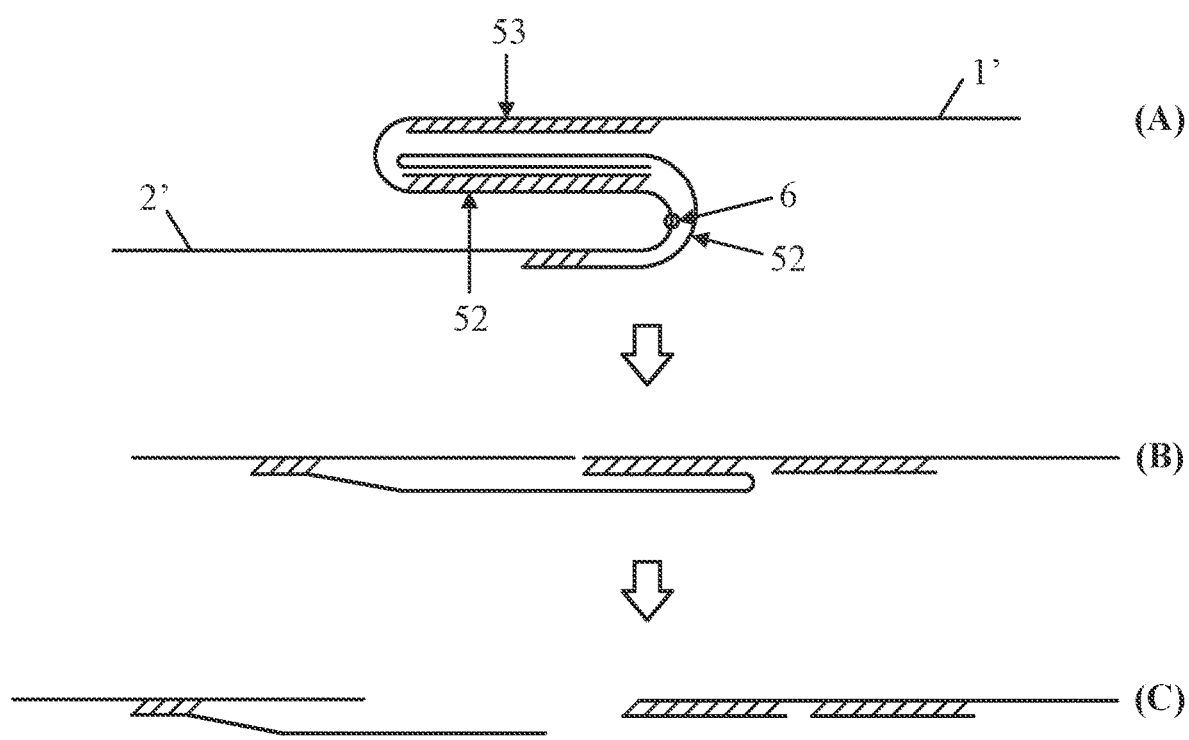
FIG. 4 is another case in practice for structure changes for baling. (A) is original; (B) is status after the film is in process of tearing: (C) is the status after torn.
Figure 5:
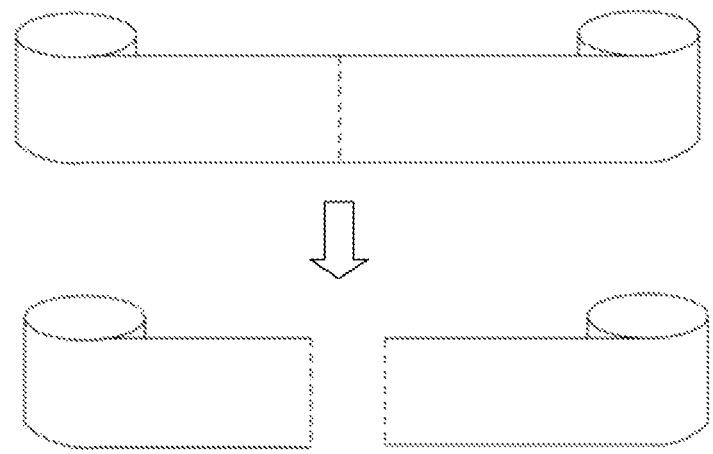
FIG. 5 shows the perforation's effects in baling for this invention.

To improve recoil force deformation, as in FIG. 4, we add a third tape 53 to Portion 1', in addition to 52. Folded bridge 51's two surfaces have different features, one is releasable, the other adhesive. The bridge can be easily peeled off from the adhesive when needed, while gluing tight at the head of the Portion 2'. Adding one more tape can solve the recoil force problem easily and economically. In production, one more step is added to the machine that specially folds the bridge making bridge rolls with 3 tapes.

Steps of this double S bridge unfolding when film is torn:
1. The bridge covers the film over the perforation line; (A)
2. The first S type fold unfolds when the film is stopped unwinding;
3. Two pieces of tapes side by side are on the same level on the film, the tape next to the perforation line is still covered by the bridge's second S fold; (B)
4. After the film torn into two parts, two tapes on Portion 1' are exposed with adhesives open, waiting to be glued at the end of the bale; (C)
5. Portion 2' is glued to the bridge which is even and hard as a lead, ready to enter the next cycle of baling. (C)

Double sided adhesive tapes 52 align with the perforation line 6 in the middle, one tape 52 on each side of perforation line 6.

All these designs are used with special machines now in production. The manufactured rolls are used in the fields. As in FIG. 5 to FIG. 8, the production line includes film production, a machine makes pre manufactured roll 50, a double sided adhesive tape laying machine, and a laser perforation machine.

Pre manufactured roll 50 is to be laid over the film, including releasable film 51, and tapes 52, 53. A part of releasable film 51 is put with double sided adhesive tape 52, another end of releasable film 51 is folded to perforation line 6 and put with double sided adhesive tape 53, in S shape.

Figure 6:
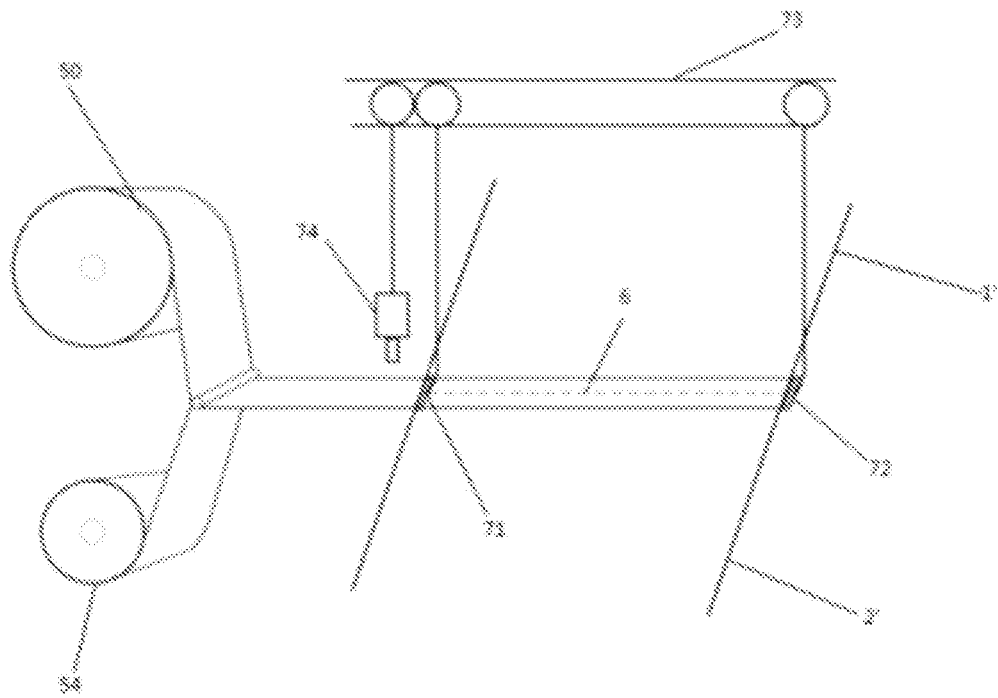
FIG. 6 is the structure of the automation production line in use of this invention.
Figure 7:
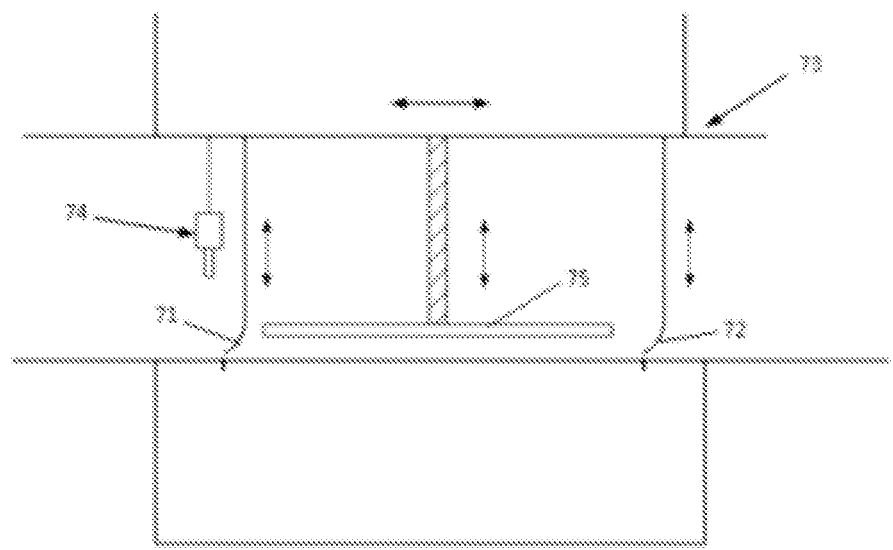
FIG. 7 is the side view of the automation production line in use of this invention, laying the roll of bridge.
Figure 8:
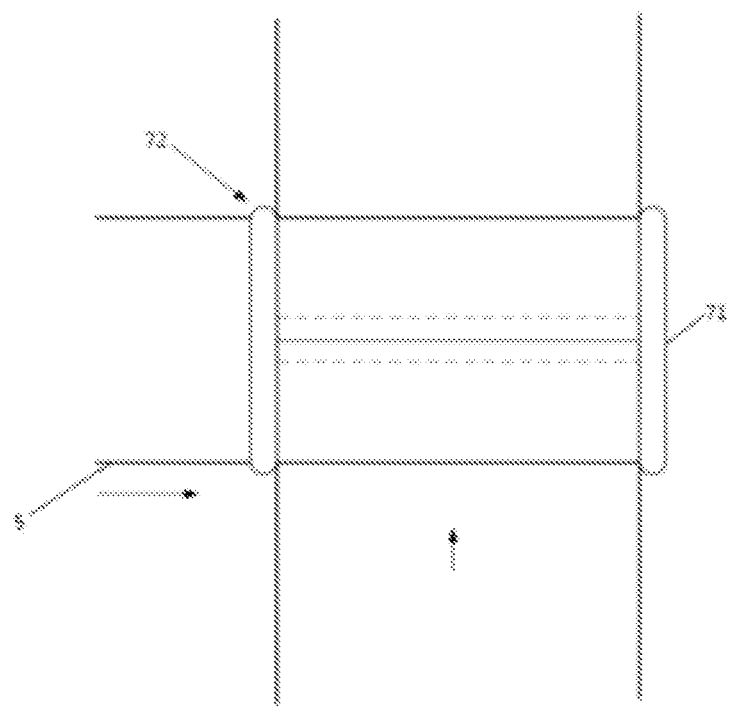
FIG. 8 is the vertical view of the automation production line in use of the invention, laying the roll of bridge over the film.

In FIG. 6, the bridge laying system includes cutter 74, down press hand 75, the first catch hand 71, the second catch hand 72, and the track 73. The roll of the bridge made of double sided adhesives 5 is grabbed by both catch hands 71 and 72, which move along the track 73. Both hands position the roll along the perforation line 6, then down press hand 75 press the bridge and glue it to the film. Cutter 74 cuts the roll 5 (FIG. 8).

Automation laser makes perforation line 6. Laser is programmable.

Cutter 74 is a laser cutter, or an air-pressure knife.

Automation machine peels off the interleaving paper 54 from the double sided adhesive tapes (FIG. 6).

The invention is an automation production system producing agricultural baling films, including:
1) perforation line made at the required position, can be made either through laser, or mechanic device;
2) pre manufactured roll of tape bridge needs to be grabbed from one side to the other across the film, aligning along the perforation line, pressing tapes to the film;
3) down press hand presses tapes tight to the film;
4) after cutting the roll all hands move back to the beginning position ready for the next cycle.

Perforation line is the middle line for the bridge roll.

Laser perforation machine is programmable.

The invention is in use and the products are produced out of the production line as designed. First, across the film the perforation line is made by laser, which is 20 to 60 cm above the film.

The holes made by the laser change according to the needed force to tear the film and the environment.

Then the interleaving paper of the double sided tapes are peeled off the tapes exposing the adhesive of the tapes. One end of the bridge is glued at the head of the next portion of the film. Winding direction of production is opposite to the unwinding direction when baling cotton on a harvester.

Then the pre manufactured roll of bridge goes over the film, after the interleaving paper being peeled off the double sided adhesive tapes. The width of the roll is about 20-30 cm, also the direction of roll is in reverse direction with baling.

The end of bale will be glued tight with the exposed double sided adhesive tape, which is 20 cm in width. This is done by uncovering of the bridge that covers the tape. The other end of bridge is glued tight on the head of next portion of the film. The bridge is peeled off the film over the perforation line by the mechanism of a brake at the unwinding roll at the time of baling. The roll laying is fully automatic and fast, with 24 bridges for each roll of baling film.

For each cycle of producing a bridge, key element of one of 24 pieces of a baling roll, fully automation has been described above, i.e. catching the bridge film, aligning the roll with tapes, pressing down the roll over the film, cutting the roll, etc.

An S shape fold of the bridge made of releasable film makes it possible to unfold easily and peeling off the adhesives attached to the film. FIG. 2 to FIG. 5 illustrate the situation when two portions of film break apart when baling on a harvester. The bale is glued tight at its own end when the double sided adhesive tape exposed. Next bale of agricultural products waits to be wrapped in sequence.

The invention has following advantages over the existing technology:
1. There is no needs for cutting and pasting of film, using Z lock type inter connection. The invention skips at least 3 processes in production;

2. Use double sided adhesive tapes replacing adding adhesives during production, making work place clean;

3. The long production line is reduced to only 5 meters long;

4. Speed of production is doubled with high efficiency.

The above described are in practice in our factory with finished rolls used by farmer in the fields. Our claims are not limited to the descriptions. Any modified forms and altered technology using the same principle of production are within our claims, protected by the invention.

What is claimed is:

1. A packaging layer for wrapping a bale of cotton within a harvester machine, the layer comprising:
   a film rolled into a roll, the film defining a length and a width, the length of the film having a plurality of tear lines dividing the film into a plurality of sections between the tear lines;
   a plurality of bridges, each bridge permanently attached to a first section at a first point and removably attached to an adjacent second section at a second point;
   a first linear distance between the first and second points measured along the film is less than a second linear distance between the first and second points measured along the bridge.

2. The layer of claim 1 wherein a portion of the bridge is folded upon each other so that the folded portion of the bridge is peeled off of the second section when the second section is separated from the first section at the tear line.

3. The layer of claim 2 wherein the folded portion of the bridge does not have any adhesive between a fold of the folded portion.

4. The layer of claim 1 wherein the bridge is attached to the first section with a double sided adhesive.

5. The layer of claim 1 wherein the bridge is attached to the first section with an adhesive having a stronger bond compared to the adhesive used to attach the bridge to the second section.

6. The layer of claim 1 wherein an adhesive used to attach the bridge to the first section of the film has a stronger adhesive bond to the first section of the film compared to the second section.

7. The layer of claim 1 wherein the bridge is disposed on an interior side of the roll.

8. The layer of claim 1 wherein the layer is harder compared to the film.

9. The layer of claim 1 wherein the layer is less flexible compared to the film.

10. The layer of claim 1 wherein the tear lines are perforations, and holes of the perforations are larger at a middle portion compared to opposed side portions.

11. A method for wrapping a bale of cotton, the method comprising the steps of:
   providing a roll of the packaging layer according to claim 1;
   loading a roll of packaging layer onto a cotton baling machine, the machine capable of stopping unrolling of the roll of packaging layer to separate adjacent sections at a tear line in the layer or allow the packaging layer to be unrolled for wrapping the layer around cotton to form the bale of cotton;
   gathering cotton within the machine;
   allowing the packaging layer to be unrolled;
   rotating the cotton so as to form a rolled cotton and to pull the packaging layer and unroll the packaging layer off of the roll of packaging layer;
   stopping the unrolling of the packaging layer while continuing to rotate the cotton to place tension on the packaging layer between the rolled cotton and the roll of packaging layer and separate the packaging layer at the tear line disposed between rolled cotton and the roll of packaging layer;
   separating the packaging layer at the tear line;
   peeling a bridge attached to the packaging layer off of the packaging layer;
   completing the separating step before completion of the peeling step to mitigate tangling of the packaging layer.

12. The method of claim 11 wherein the packaging layer is fabricated from a polyethylene material.

13. The method of claim 12 wherein the separating step comprises the step of tearing the packaging layer at a perforation, and starting the tear at a middle portion of the perforation.

14. The method of claim 12 further comprising a step adhering the bridge to the packaging layer.

15. The method of claim 11 wherein the bridge is fabricated from a material which is harder compared to the packaging layer.

* * * * *